United States Patent
Scotson

(10) Patent No.: US 11,837,031 B2
(45) Date of Patent: Dec. 5, 2023

(54) DISTRIBUTED VOTING PLATFORM

(71) Applicant: Arthur Andrew Montgomery Scotson, Spanish Fork, UT (US)

(72) Inventor: Arthur Andrew Montgomery Scotson, Spanish Fork, UT (US)

( * ) Notice: Subject to any disclaimer, the term of this patent is extended or adjusted under 35 U.S.C. 154(b) by 1191 days.

(21) Appl. No.: 15/204,786

(22) Filed: Jul. 7, 2016

(65) Prior Publication Data

US 2017/0011576 A1    Jan. 12, 2017

Related U.S. Application Data

(60) Provisional application No. 62/190,174, filed on Jul. 8, 2015.

(51) Int. Cl.
*G07C 13/00* (2006.01)
*H04L 9/40* (2022.01)

(52) U.S. Cl.
CPC .......... *G07C 13/00* (2013.01); *H04L 63/0861* (2013.01); *H04L 63/105* (2013.01); *G06Q 2230/00* (2013.01)

(58) Field of Classification Search
CPC ... G07C 13/00; H04L 63/0861; H04L 63/105; G06Q 2230/00
USPC .......................................................... 705/12
See application file for complete search history.

(56) References Cited

U.S. PATENT DOCUMENTS

| | | | | |
|---|---|---|---|---|
| 5,412,727 A * | 5/1995 | Drexler | .................. | G07C 13/00 705/76 |
| 5,815,252 A * | 9/1998 | Price-Francis | ......... | G07C 9/257 356/71 |
| 5,870,723 A * | 2/1999 | Pare, Jr. | .................. | G06F 21/86 705/39 |
| 5,991,429 A * | 11/1999 | Coffin | ................ | G06K 9/00255 382/118 |
| 6,607,137 B2 * | 8/2003 | Morales | ................. | G07C 13/00 235/492 |
| 7,340,770 B2 * | 3/2008 | Freund | ................ | H04L 63/0227 726/11 |
| 7,516,892 B2 * | 4/2009 | Haas | ...................... | G07C 13/00 235/386 |
| 7,921,033 B2 * | 4/2011 | Huang | ................... | G07C 13/00 705/12 |
| 8,135,385 B2 * | 3/2012 | Ohta | ..................... | G06F 21/604 455/411 |

(Continued)

FOREIGN PATENT DOCUMENTS

WO   WO-2014061039 A2 *   4/2014   ............ G07C 13/00

*Primary Examiner* — John W Hayes
*Assistant Examiner* — Edgar R. Martinez-Hernandez
(74) *Attorney, Agent, or Firm* — Dax D. Anderson; Kirton McConkie

(57) ABSTRACT

An automated voting platform can allow a user to register to vote, view information about candidates, and submit votes in an election using his or her own personal computing device. To minimize the likelihood of voter fraud, the automated voting platform can implement an authentication process that requires the user to submit biometric or other identification information prior to being enabled to access the user's account with the automated voting platform. This authentication process can also require the user to repeatedly submit biometric information thereby ensuring that the same user continues to use the computing device while accessing the user's account.

7 Claims, 4 Drawing Sheets

(56) References Cited

U.S. PATENT DOCUMENTS

| | | | | |
|---|---|---|---|---|
| 8,316,237 B1* | 11/2012 | Felsher | ............... | H04L 9/0825 |
| | | | | 380/282 |
| 8,843,389 B2* | 9/2014 | Kaplan | ............... | G07C 13/00 |
| | | | | 705/12 |
| 8,899,480 B2* | 12/2014 | Contorer | ............... | G07C 13/00 |
| | | | | 235/386 |
| 9,282,104 B2* | 3/2016 | Mogaki | ............... | G06F 21/33 |
| 9,596,088 B1* | 3/2017 | Oakes, III | ............. | H04L 9/3247 |
| 2003/0149616 A1* | 8/2003 | Travaille | ............... | H04H 20/38 |
| | | | | 705/12 |
| 2003/0159032 A1* | 8/2003 | Gerck | ............... | G07C 13/00 |
| | | | | 713/156 |
| 2005/0284935 A1* | 12/2005 | Sinha | ............... | G07C 13/00 |
| | | | | 235/386 |
| 2007/0241190 A1* | 10/2007 | Hotto | ............... | G07C 13/00 |
| | | | | 235/386 |
| 2009/0079538 A1* | 3/2009 | Fein | ............... | G07C 13/00 |
| | | | | 340/5.82 |
| 2009/0230192 A1* | 9/2009 | Ghafarzadeh | .......... | G07C 13/00 |
| | | | | 235/386 |
| 2010/0017274 A1* | 1/2010 | Liesenfelt | ............... | G07C 13/00 |
| | | | | 705/12 |
| 2010/0133340 A1* | 6/2010 | Huntley | ............... | G07F 17/329 |
| | | | | 235/386 |
| 2011/0040605 A1* | 2/2011 | Evertz | ............... | G07C 13/00 |
| | | | | 705/12 |
| 2011/0053559 A1* | 3/2011 | Klein | ............... | G07C 13/00 |
| | | | | 235/386 |
| 2011/0320355 A1* | 12/2011 | Pasha | ............... | G06Q 20/02 |
| | | | | 705/44 |
| 2012/0023235 A1* | 1/2012 | Hole | ............... | H04W 72/1268 |
| | | | | 709/226 |
| 2012/0072269 A1* | 3/2012 | Piccionelli | ............. | G07C 13/00 |
| | | | | 705/12 |
| 2014/0133713 A1* | 5/2014 | Kim | ............... | G06F 21/31 |
| | | | | 382/118 |
| 2014/0249895 A1* | 9/2014 | Anderson | .......... | G06Q 30/0277 |
| | | | | 705/12 |
| 2015/0310686 A1* | 10/2015 | Backert | ............... | G06F 21/36 |
| | | | | 705/12 |
| 2019/0213820 A1* | 7/2019 | Sebes | ............... | G07C 13/00 |

\* cited by examiner

DISTRIBUTED VOTING PLATFORM

CROSS-REFERENCE TO RELATED APPLICATIONS

The application claims priority to U.S. Provisional Patent Application No. 62/190,174 which was filed Jul. 8, 2015.

BACKGROUND

Voting in an election typically requires a voter to be physically present at a voting location or to mail in an absentee ballot. These methods create logistical and convenience barriers to voting, require a large number of human workers to administer, are susceptible to human error and fraud, create voter identification concerns, and enable ongoing risks to the integrity of the voting process.

BRIEF SUMMARY

The present invention extends to methods, systems, and computer program products for providing an automated voting platform that permits the submission of votes from any location using any of a number of different computing devices. To minimize the likelihood of voter fraud, the automated voting platform can implement an authentication process that requires a user to submit biometric or other identification information via a computing device in order to access the user's account on the automated voting platform. This authentication process can also require a user to continuously submit biometric information while accessing the automated voting platform via the computing device to ensure that no other person can obtain access to the user's account via the computing device.

The automated voting platform can also provide the ability to register to vote via a computing device. The automated voting platform can be interfaced with appropriate governmental systems to facilitate the registration of voters, the verification of voter registration, and the reporting of user's votes in elections. Accordingly, the automated voting platform of the present invention can greatly simplify the voting process thereby encouraging voter participation.

In one embodiment, the present invention is implemented as a method for providing an automated voting platform. A request to access an account of the automated voting platform is received from a client computing device. The request includes user credentials for performing a first level of authentication. Biometric information of a user of the client computing device is also received from the client computing device. The received biometric information of the user is compared to stored biometric information that is associated with the account to perform a second level of authentication. Upon determining that the received biometric information matches the stored biometric information, the user is enabled to access the account to submit a vote for one or more candidates in an election.

In another embodiment, the present invention is implemented as a method for providing an automated voting platform. Account information is received from a user. The account information includes personally identifiable information of the user and voter registration information for the user. An account is created for the user on the automated voting platform and identified as an unauthenticated account. The user is prevented from accessing the automated voting platform to submit votes while the account is identified as an unauthenticated account. The voter registration information is submitted to a governmental system. Verification is received from the governmental system that the user is registered to vote. In response to receiving the verification, the account is identified as an authenticated account. The user is then allowed access to the automated voting platform to submit votes.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile devices, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a group of networked servers or server resources. Accordingly, the present invention can be hosted in a cloud environment.

Figure 1:
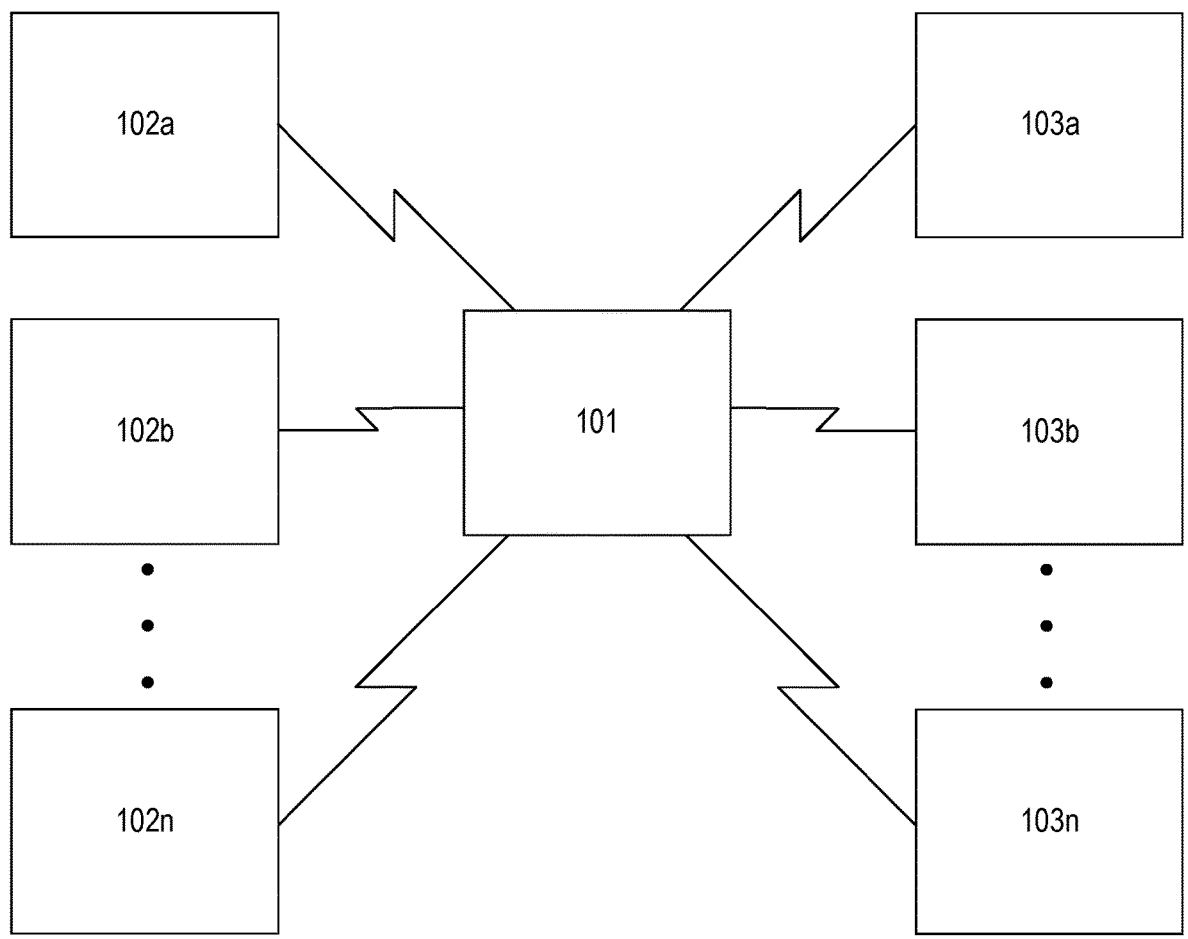
FIG. 1 illustrates an example computing environment in which the present invention can be implemented.

FIG. 1 illustrates an example computer environment 100 in which the present invention can be implemented. Computer environment 100 includes a voting system 101, a number of governmental system 102a-102n, and a number of client computing devices 103a-103n. Client computing devices 103a-103n can be connected to voting system 101 via a network which would typically be the internet. However, any suitable network could be employed.

Client computing devices 103a-103n can represent any type of personal computing device that is capable of communicating with voting system 101. For example, client computing devices 103a-103n can include stationary computing devices, personal computers, laptops, tablets, mobile phones, mobile devices, personal music devices, smart televisions, etc.

Governmental systems 102a-102n can represent any of the many different systems employed by various governmental entities that hold elections. For example, governmental systems 102a-102n can include state systems used to maintain voter registration information or other systems used to implement elections. Voting system 101 can be coupled to governmental systems 102a-102n in any suitable manner including over the internet or via a dedicated network.

In accordance with embodiments of the present invention, voting system 101 can serve as an interface for allowing users to participate in an election via any of client computing devices 103a-103n. For example, voting system 101 can provide a way for users to register to vote using client computing devices 103a-103n. Voting system 101 can also provide a way for registered voters to vote using client computing devices 103a-103n. In this way, voting system 101 functions as an intermediary between client computing devices 103a-103n and governmental systems 102a-102n to facilitate voting from virtually any location.

Figure 2:
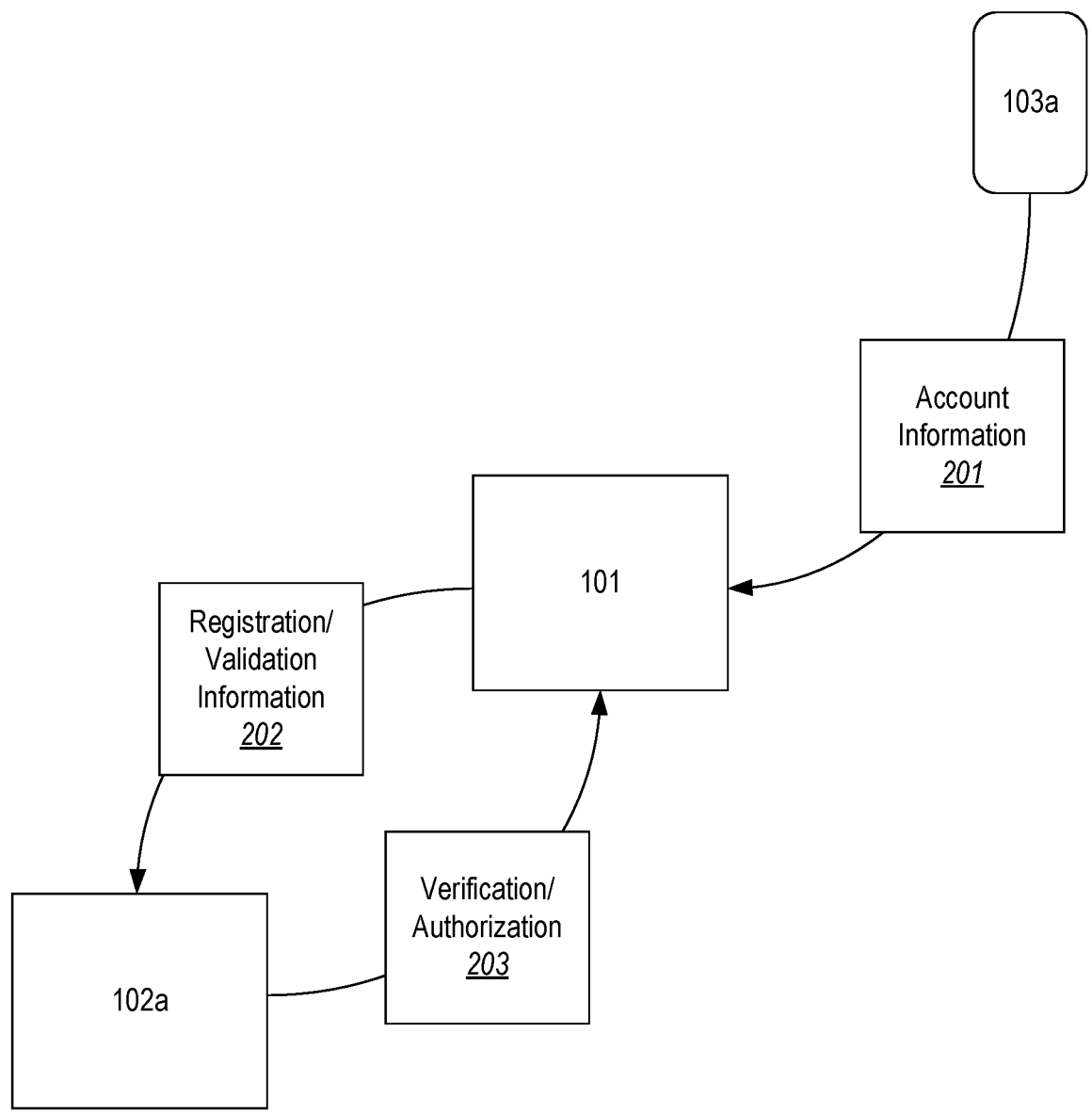
FIG. 2 illustrates communications that can occur among a client computing device, a voting system, and a governmental system when an account is created with the voting system.

FIG. 2 illustrates an example of how a user of client computing device 103a can create an account with voting system 101. A user, whether currently a registered voter or not, can create an account with voting system 101 in order to vote in an election. As part of the account creation process, voting system 101 can interface with the appropriate governmental system to either register a user to vote if the user has not previously registered or to verify that the user is registered to vote. This process of registering the user to vote or of verifying the registration status of the user can function as a means for validating the identity of the user requesting the account. Accordingly, voting system 101 employs the account creation process to ensure that only users whose identity has been verified by the applicable governmental entity will have the ability to vote via voting system 101.

In the example of FIG. 2, it will be assumed that governmental system 102a represents a system employed by a first state to maintain a registry of registered voters and that a user of client computing device 103a, who lives in the first state, is requesting that an account be created with voting system 101. When a user requests that an account be created, voting system 101 can request that the user provide various types of information. This information will be referred to generally as account information 201.

Account information 201 can include the user's personally identifiable information such as the user's name, address, birthdate, social security number, etc. Account information 201 can also include authentication information such as a username, password, biometric information, answers to security questions, etc. Account information 201 can also include voter registration information such as an indication of whether the user is registered to vote, and if so, the user's voter identification number. Regardless of whether the user is registered to vote, the voter registration information can also include whatever information is required by the applicable governmental entity (e.g., the first state) to verify a user's identity and eligibility to vote. Examples of information that may be required by a governmental entity include a driver's license number or copy of a driver's license, a birth certificate, a passport, a social security card, or other proof of residency (e.g., a current utility bill). Account information 201, in some embodiments, may also include classification information such as the user's political party, ethnicity, gender, income level, political ideology, etc. In short, account information 201 can include any information that is required by a governmental entity or that can be employed by voting system 101 to implement the automated voting platform as will be further described below.

Account information 201 can be requested and received in a single communication or via a number of communications. For example, voting system 101 can initially request the user's personally identifiable information in order to identify the applicable governmental entity and to determine which voter registration information will be required to complete and/or verify voter registration.

Accordingly, as shown in FIG. 2, client computing device 103a sends account information 201 to voting system 101. In typical implementations, the user can input account information 201 to client computing device 103a via a browser or dedicated application (e.g., a mobile app) and then client computing device 103a can transfer account information 201 to voting system 101 using standard internet protocols. However, the specific manner in which account information 201 is input and transferred is not essential to the invention.

Upon receiving account information 201, voting system 101 can commence the process of creating a user account. This account creation process includes two main parts. First, voting system 101 can create the structure of the user account such as by establishing the credentials for logging in to the voting system and customizing the user's experience based on any classification information provided (e.g., political party). For purposes of this specification, after voting system 101 has performed this first part of the account creation process, the created account will be referred to as an unauthenticated user account. Unauthenticated refers to the fact that the user account has yet to be authenticated by the appropriate governmental entity or entities.

Second, voting system 101 can register the user to vote or can verify that the user is registered to vote. This second part of the account creation process can serve as a way to receive the applicable governmental entity's authorization to allow the user to vote via the automated voting platform. Accordingly, after a user account has successfully completed the second part of the account creation process, the user account can be considered an authenticated user account. Authenticated refers to the fact that the applicable governmental entity or entities have verified the identity of the user and have authorized the user to use the authenticated user account to vote via voting system 101.

To accomplish the second part of the account creation process, voting system 101 can submit a subset of account information 201 to governmental system 102a. As shown in FIG. 2, the information submitted to governmental system 102a to perform the second part of the account creation process will be referred to as registration/validation information 202. Each governmental system 102a-102n can define which type of information should be included within registration/validation information 202. For example, governmental system 102a may define that registration/validation information 202 should include the user's name, address, and driver's license number. To facilitate the provision of appropriate information, voting system 101 can maintain a database that defines which types of information should be included in registration/validation information 202 for any particular governmental system. The contents of registration/validation information 202 may also vary based on whether the user is already a registered voter.

In cases where the user is already a registered voter, voting system 101 can communicate with governmental system 102a to verify that voter registration information provided in account information 201 matches the user's corresponding voter registration information maintained by governmental system 102a (which may have been provided to governmental system 102a at a previous time in any suitable manner including via previous registration through voting system 101). For example, a driver's license number included in account information 201 could be checked against a driver's license number that was used previously to register the user to vote.

If the voter registration information provided in account information 201 matches voter registration information stored by governmental system 102a for the user, governmental system 102a can notify voting system 101 that the user has been authenticated and authorized to use voting system 101 to vote. This is shown in FIG. 2 as verification/authorization 203 being sent by governmental system 102a to voting system 101. In response, voting system 101 can categorize the user's account as an authenticated account. In contrast, if the information fails to match, governmental system 102a can notify voting system 101 of the failure. In response, voting system 101 can notify the user of the failure and provide the opportunity to correct the reason for the failure (e.g., by submitting a different document, correcting an error in the personally identifiable information, etc.).

On the other hand, in cases where the user is not registered to vote, registration/validation information 202 can be submitted to governmental system 102a in the form of a request to register the user to vote. Governmental system 102a can then review registration/validation information 202 and inform voting system 101 whether the user has been successfully registered to vote and whether the user is authorized to vote via voting system 101 (e.g., via verification/authorization 203). In response, voting system 101 can categorize the user's account as an authenticated account.

Accordingly, regardless of whether the user is registered to vote when requesting an account with voting system 101, the applicable governmental system maintains control over which user's will be authorized to vote via voting system 101. For any user that does not receive authorization from the applicable governmental system, voting system 101 can prevent the user from voting (e.g., by retaining the user's account as an unauthenticated account).

Voting system 101 can therefore be configured to prevent any user account that is unauthenticated from accessing the voting platform. Even if voting system 101 allows a user to access an unauthenticated account (e.g., to view information about political candidates, political issues, or other information provided by voting system 101), the user will be prevented from submitting votes in an election via voting system 101.

After an account with voting system 101 has been created for a user, the second part of the account creation process can be repeated at a subsequent time to re-authenticate the account. For example, after an election has been completed, voting system 101 can invalidate (or de-authenticate) each user account thereby requiring each account to be re-authenticated prior to voting in the next election. The process of re-authenticating can be substantially the same as described above. For example, the user can be required to submit the appropriate registration/validation information 202 to voting system 101 which can then relay the registration/validation information 202 to the appropriate governmental system for verification.

Once a user's account has been authenticated by the appropriate governmental entity or entities, voting system 101 can allow the user to access the voting platform to submit votes in an election. Based on account information 201, voting system 101 can identify which candidates and issues the user should be allowed to vote on. For example, based on an address provided in account information 201 (and verified by the applicable governmental entity), voting system 101 can identify the user's voting district(s). Alternatively, in some embodiments, the user's voting districts can be specified by the governmental system during the verification/authorization process. In such cases, verification/authorization 203 can include information that identifies the user's voting districts. In this way, governmental systems 102a-102n can retain granular control over which candidates and issues the user is allowed to vote on.

Prior to allowing a user to access his or her account, voting system 101 can implement an authentication process. It is noted that this authentication process implemented by voting system 101 is distinct from the process of the applicable government entity authenticating the user's account to enable voting via voting system 101. The authentication process implemented by voting system 101 can be based on the authentication information that was provided by the user in account information 201. As is typical, in many embodiments, the authentication process can require the user to input a username and password and can possibly require the user to answer various security questions. In addition to these initial authentication steps, the authentication process can include a biometric authentication routine to ensure that the individual that is interacting with client computing device 103a is in fact the user. Accordingly, client computing device 103a can be required to capture biometric information of the user as the user is accessing voting system 101.

As stated above, account information 201 can include biometric information such as a facial scan, a thumb or finger scan, an iris scan, voice input, etc. As such, voting system 101 can store biometric information for each user account that it creates. When the user subsequently attempts to access his or her account, voting system 101 can again require the user to submit biometric information to be compared with the corresponding stored biometric information. Only if the submitted biometric information matches the corresponding stored biometric information will voting system 101 allow the user to access the voting platform to submit votes. Any type, amount, or combination of biometric information could be employed in this process. Also, the required type, amount, or combination of biometric information can be specified by the applicable governmental entity or entities. In this way, voting system 101 ensures that no individual other than the user whose identity had previously been verified by the applicable governmental entity or entities can submit votes.

In a particular example, voting system 101 can be configured to employ facial scans as the required biometric information. Many client computing devices include forward facing cameras. Voting system 101 can employ such cameras while the user is accessing voting system 101 via the client computing device to obtain facial scans of the user. For example, as the user is inputting a username and password to login to his account, voting system 101 can cause client computing device 103a to capture a facial scan (or picture) of the user. This facial scan can then be transmitted by client computing device 103a to voting system 101 for comparison to a facial scan that was previously obtained as part of account information 201. By employing facial scans, the biometric authentication routine can be performed with minimal burden on the user. In particular, the user need only face client computing device 103a at the appropriate time to provide the necessary biometric information.

As stated above, this biometric authentication routine can be performed as part of the initial login process. However, in many cases, this may not be sufficient to prevent improper access to the voting platform. For example, if the biometric authentication process is only performed at login, an unauthorized individual could obtain access to the user's account if the individual is able to access client computing device 103a after the user completes the login process.

To address these security concerns, in some embodiments of the invention, voting system 101 can be configured to continuously implement the biometric authentication routine throughout the user's access to the voting platform. In other words, voting system 101 can require the user to continuously provide matching biometric information in order to retain access to the voting platform. If the user fails to provide biometric information at any point during access, voting system 101 can immediately block access to the voting platform from client computing device 103a.

This continuous input of biometric information can be accomplished in various ways including by requiring the user to repeatedly place or continuously hold a finger or thumb over a scanner, by requiring the user to repeatedly speak, by requiring the user to repeatedly scan his iris, etc. However, such techniques could be bothersome and hinder the submission of votes. Accordingly, in preferred embodiments, voting system 101 can cause client computing device 103a to repeatedly capture a facial scan of the user. Because the user's face will be positioned in front of the screen when the user is accessing the voting platform, a facial scan can easily be captured with minimal involvement from the user. In some embodiments, this repeated capture of a facial scan can be performed at a frequent interval, and therefore, this process will be referred to as a continuous facial scan. However, in other embodiments, a capture of a facial scan may only be performed at certain points during the voting process such as at login, prior to submitting each vote, prior to formally submitting the user's votes, etc.

By performing a continuous facial scan, voting system 101 can ensure that the user remains in front of client computing device 103a during access to the voting platform. Therefore, if the user were to place down client computing device 103a (e.g., a phone) or otherwise move away from client computing device 103a, a subsequent attempt to capture a facial scan of the user would fail (i.e., client computing device 103a would capture an image of something other than the user's face which would therefore fail to match the stored facial scan). Similarly, if another individual were to use client computing device 103a while the user is accessing the voting platform, client computing device 103a would capture a facial scan of the individual rather than the user thereby resulting in a failed match.

In any instance where the currently received facial scan fails to match the facial scan stored by voting system 101, voting system 101 can immediately block further access to the voting platform. In some embodiments, the blocking of access can initially be temporary (e.g., by freezing or blanking the screen). In such cases, access can be restored as soon as client computing device 103a again provides a matching facial scan. If a matching facial scan is not received after a specified amount of time (e.g., one minute), the user can be logged out of the account thereby requiring the user to compete the full authentication process before again obtaining access to the voting platform. In other embodiments, voting system 101 may immediately log a user out once a received facial scan fails to match.

Figure 3:
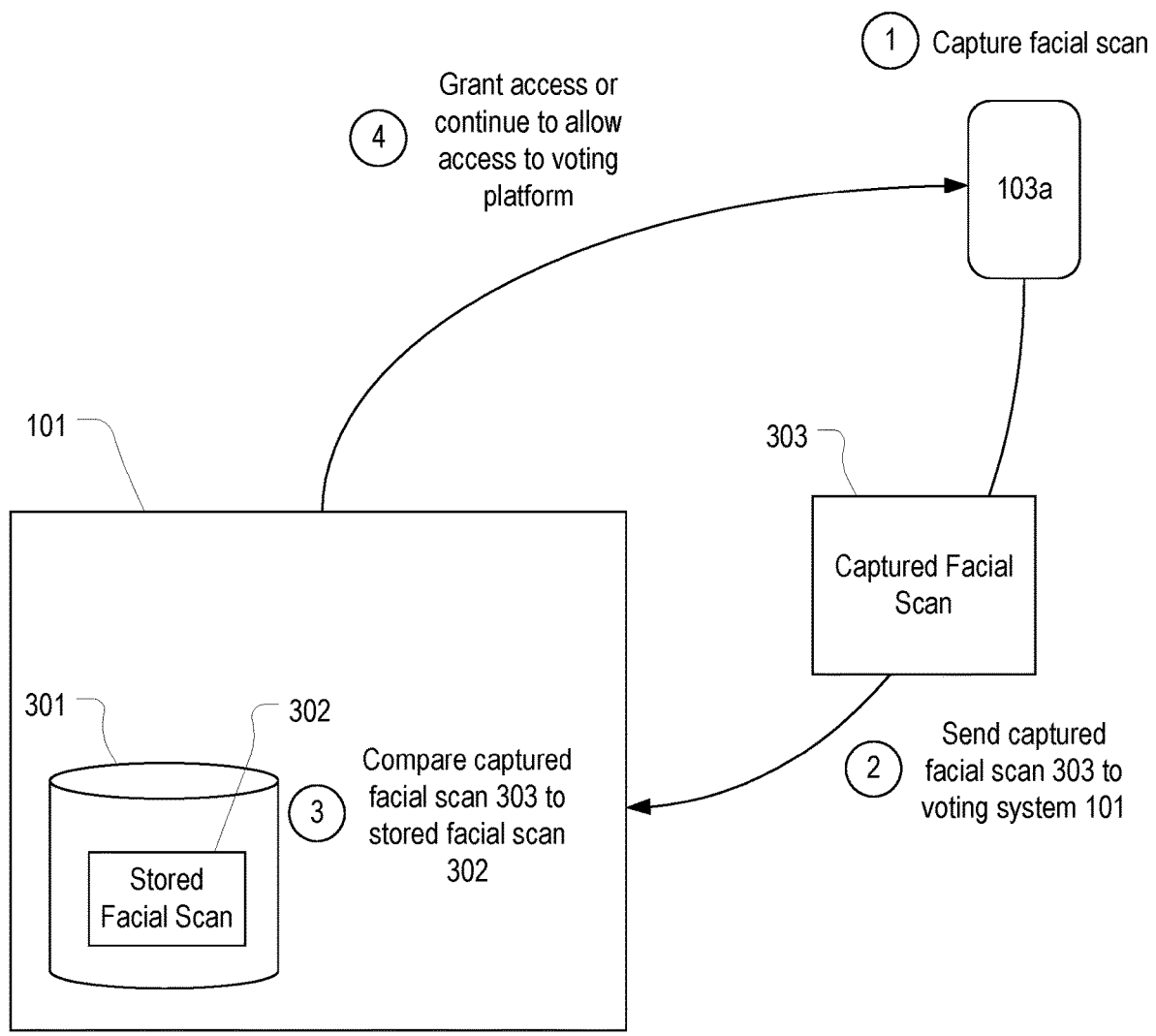
FIG. 3 provides a flowchart that depicts steps of a biometric authentication routine that the voting system implements to control access to the voting platform.

FIG. 3 illustrates how the biometric authentication routine can be implemented between client computing device 103a and voting system 101. As shown, voting system 101 can include a database 301 which stores account information 201 for a number of different users. Accordingly, database 301 can include a stored facial scan 302 for the user of client computing device 103a. As the user employs client computing device 103a to access his or her account on voting system 101, voting system 101 can cause client computing device 103a to capture a facial scan of the user and send the captured facial scan 303 to voting system 101. Voting system 101 can then compare captured facial scan 303 to stored facial scan 302. If captured facial scan 303 matches stored facial scan 302, voting system 101 can determine that the user of client computing device 103a is in fact the verified and authorized user for the account. In response, voting system 101 can grant or continue to grant access to the voting platform (e.g., to allow the user to submit votes in an election). This process can be continuously repeated throughout the duration of client computing device 103a's access to the voting platform.

Figure 4A:
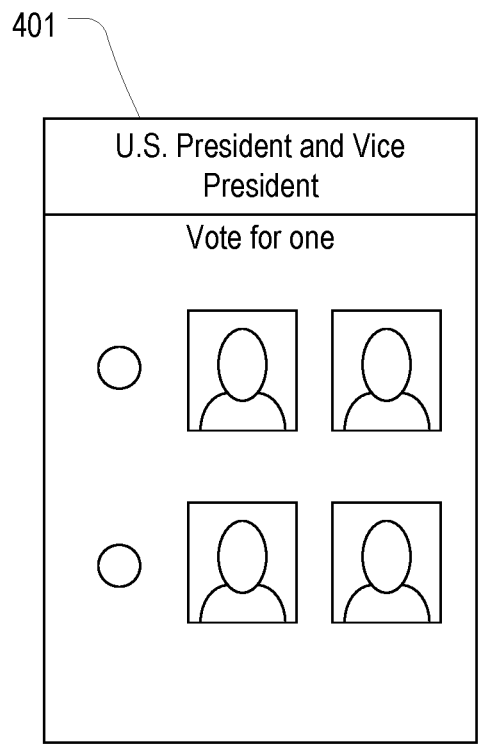
FIGS. 4A-4C each illustrate an example of a user interface that can be displayed within the voting platform to allow a user to submit votes.
Figure 4B:
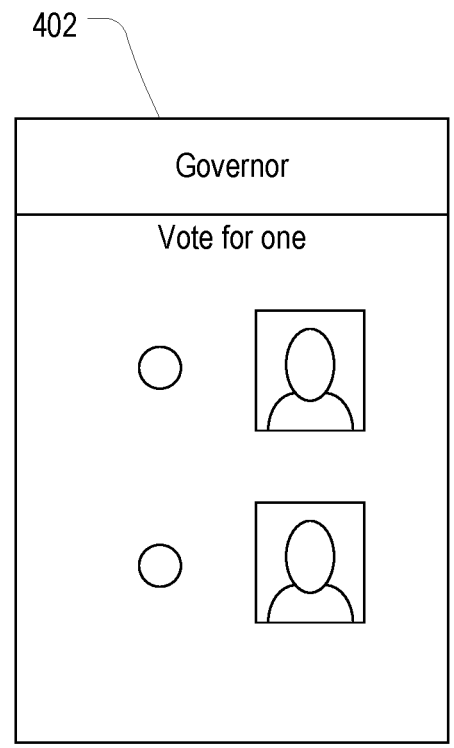
Figure 4C:
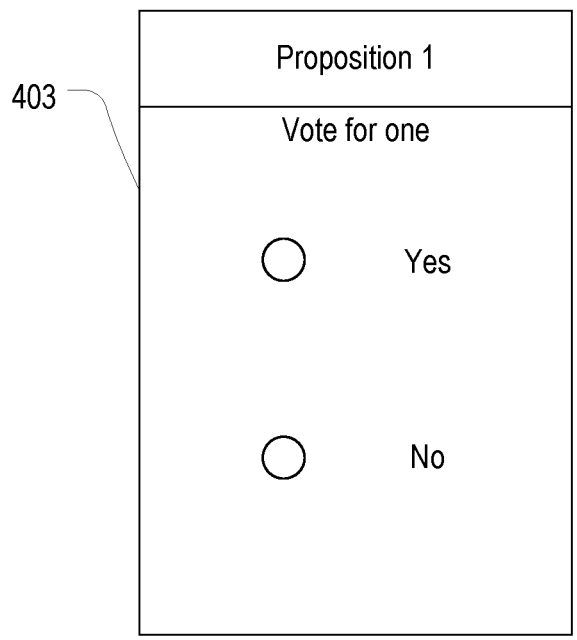

FIGS. 4A-4C each illustrate an example of a user interface 401-403 that can be displayed as part of the voting platform to allow the user to submit a vote. As described above, in order to view user interfaces 401-403, and more particularly, in order to submit votes via user interfaces 401-403, the biometric authentication routine can be executed to ensure that only the verified and authorized user is able to use client computing device 103*a* to submit the votes.

User interface 401 provides an option to submit a vote for the president and vice president of a country, user interface 402 provides an option to submit a vote for the governor of a state, and user interface 403 provides an option to submit a vote on a proposition. As stated above, which candidates and ballot measures are displayed to the user are based on the user's voting districts. Although not shown, voting system 101 can provide a user interface which summarizes the votes that the user has submitted and can allow the user to change any votes before formally submitting them. Once the user has formally submitted his or her votes, voting system 101 can submit the votes to the applicable governmental system for final processing and tallying. After votes are formally submitted for a user's account, voting system 101 can prevent any further votes from being submitted via the account.

In some embodiments, voting system 101 can provide an option to save votes that have been entered but not formally submitted. For example, after providing a vote in user interface 401, voting system 101 can allow the user to save his or her progress in order to later return to the voting platform to resume the voting process. In this way, the user can have sufficient time to thoroughly research the candidates or issues to make a well-informed decision. In some embodiments, voting system 101 can provide information (e.g., via links included in user interfaces 401-403) to allow the user to research the candidates or issues within the voting platform.

In some embodiments, the authentication process can also include obtaining the location of client computing device 103*a*. For example, during initial login or at some time during access to the account, voting system 101 can receive GPS coordinates of client computing device 103*a*. Voting system 101 can use the GPS coordinates to identify whether the user is presently located at or near the user's home address (or other known address such as a work address that may have been provided in account information 201). In cases where the user is not located at or near the user's home address (or other known address), voting system 101 can require the user to provide additional authentication information.

Voting system 101 can also be configured to compare the GPS coordinates received from one client computing device with those received from other client computing devices that have been used to submit votes. If voting system 101 detects that the same or similar GPS coordinates are received from many different client computing devices during the voting period, voting system 101 can require additional biometric or other identification information from any user attempting to vote when located at or near the GPS coordinates. In this way, voting system 101 can detect instances where a user may be attempting to vote for many different users (e.g., instances where a user is attempting to buy other users' votes) or when someone other than the user is attempting to fraudulently access the user's account.

Also, voting system 101 can be configured to identify an IP address from which an attempt to access a user's account is received. If the user has not previously accessed his or her account from the identified IP address, the user can be required to provide additional authentication information.

In some embodiments, if an attempt to access a user's account is received while the user is already logged in to the account, voting system 101 can deny the second request to prevent concurrent access by multiple users and/or client computing devices. In such cases, the user can be notified of the second attempt and given the opportunity to confirm whether the second attempt was unauthorized.

To summarize, the present invention provides an automated voting platform that enables a user to vote in an election using any suitable client computing device including the user's own personal devices. In this way, the user can vote from virtually any location in the world. The biometric authentication routine can be employed to ensure the integrity of the voting process. The voting process can therefore be simplified leading to greater voter turnout and better-informed votes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method of providing a secure, remote voting system, the method comprising:
   - connecting the remote voting system via a network to a client computing device comprising a user interface, a facial scanner, location information, and an IP address;
   - connecting the remote voting system to a governmental voting system;
   - receiving account information from a user via a remote information transfer to the remote voting system, the account information comprising personally identifiable information, a physical address of the user, the IP address of the client computing device, and an electronic facial scan of the user obtained with the facial scanner of the client computing device;
   - via the remote voting system, creating an account for the user on an automated voting platform and identifying the account as an unauthenticated account, wherein the account provides access to election information;
   - while the user is logged into the account, blocking the subsequent digital requests to log into the account, thereby preventing concurrent access to the account by an additional user or by an additional client computing device;
   - using a blocking feature of the remote voting system to prevent the user from accessing the automated voting platform while the account is identified as an unauthenticated account, but continuing to allow access to the election information through the account;
   - after receiving the account information, automatically submitting at least part of the account information from the remote voting system to the governmental voting system;
   - obtaining verification from the governmental voting system that the user is registered to vote and authorized to use the automated voting platform;
   - in response to receiving the verification, automatically identifying the account as an authenticated account;
   - while the account is identified as an authenticated account, and while the user is logged into the account, enabling the user to access the automated voting platform via the account by disabling the blocking feature of the remote voting system;
   - while the user is accessing the automated voting platform, receiving usage information sent from the client computing device to the remote voting system, the usage information comprising (i) a continuous facial scan of the user that is concurrently captured by the facial scanner of the client computing device, (ii) the location information of the client computing device, and (iii) the IP address of the client computing device;

using a comparison feature of the remote voting system to compare the usage information to the account information to verify that the usage information sufficiently matches the account information, including that the continuous facial scan sufficiently matches the electronic facial scan of the user, the location information of the client computing device sufficiently matches the physical address of the user, and the IP address of the client computing device sufficiently matches the IP address stored in the account information;

while the user is accessing the automated voting platform, providing an option for the user to save a partially completed voting ballot to the remote voting system, such that the user can discontinue accessing the automated voting platform then later return to access the automated voting platform and continue where the user left off;

instructing the client computing device to enable the user to remotely submit a vote to the automated voting platform if the usage information sufficiently matches the personally identifiable information;

if the usage information does not sufficiently match the account information at any time, preventing the user from remotely submitting a vote to the automated voting platform by remotely blocking access of the client computing device to the automated voting platform;

after the user has submitted a vote to the automated voting platform, submitting the vote to the governmental voting system via the remote voting system; and automatically identifying the account as an unauthenticated account once the remote voting system has submitted the vote to the governmental voting system, such that the user must reauthenticate the account before accessing the automated voting platform prior to a subsequent election.

2. The method of claim 1, wherein the method further comprises sending a request to the governmental voting system, requesting that the user be registered to vote.

3. The method of claim 1, wherein the method further comprises allowing the user to log into and access the account (regardless of whether the account is identified as authenticated or unauthenticated) only upon completion of a login authentication process, the login authentication process includes capturing biometric information of the user using the client computing device, submitting the biometric information to the remote voting system, comparing the biometric information with the account information, and verifying that the account is associated with the user, wherein the biometric information comprises a biometric facial scan.

4. The method of claim 3, wherein the facial scanner of the client computing system comprises a forward-facing camera, wherein the electronic facial scan comprises a digital photograph, and wherein the continuous facial scan comprises continuous repeated capture of digital photographs.

5. The method of claim 4, wherein remotely blocking access of the client computing device to the automated voting platform if the usage information does not sufficiently match the account information further comprises temporarily disabling access to the automated voting platform, then reenabling access to the automated voting platform if the remote voting system received updated usage information that sufficiently matches the account information.

6. The method of claim 5, wherein if no updated usage information that sufficiently matches the account information is received, the user is automatically logged out of the account.

7. The method of claim 6, wherein the account information comprises a finger scan, an iris scan, and voice input from the user, and wherein the usage information further comprises a corresponding finger scan, a corresponding iris scan, and corresponding voice input from the user.

* * * * *